United States Patent
Masuda et al.

(10) Patent No.: US 9,969,892 B2
(45) Date of Patent: May 15, 2018

(54) ANTIFOULING COATING COMPOSITION, ANTIFOULING COATING FILM, SUBSTRATE WITH ANTIFOULING COATING FILM, AND PRODUCTION PROCESS FOR THE SUBSTRATE

(71) Applicant: CHUGOKU MARINE PAINTS, LTD., Otake-shi (JP)

(72) Inventors: Satoshi Masuda, Otake (JP); Yusuke Hayashi, Otake (JP)

(73) Assignee: CHUGOKU MARINE PAINTS, LTD., Otake-shi (JP)

( * ) Notice: Subject to any disclaimer, the term of this patent is extended or adjusted under 35 U.S.C. 154(b) by 0 days. days.

(21) Appl. No.: 14/892,835

(22) PCT Filed: May 21, 2014

(86) PCT No.: PCT/JP2014/063434
§ 371 (c)(1),
(2) Date: Nov. 20, 2015

(87) PCT Pub. No.: WO2014/189069
PCT Pub. Date: Nov. 27, 2014

(65) Prior Publication Data
US 2016/0168392 A1 Jun. 16, 2016

(30) Foreign Application Priority Data
May 22, 2013 (JP) ................. 2013-107926

(51) Int. Cl.
C09D 5/16 (2006.01)
C08F 220/18 (2006.01)
C08F 230/00 (2006.01)
C09D 133/08 (2006.01)
C08K 5/3415 (2006.01)
C08K 5/3432 (2006.01)
C08K 5/3492 (2006.01)
C08K 5/43 (2006.01)
C08K 5/55 (2006.01)

(52) U.S. Cl.
CPC .......... *C09D 5/1668* (2013.01); *C08F 220/18* (2013.01); *C08F 230/00* (2013.01); *C09D 5/165* (2013.01); *C09D 5/1625* (2013.01); *C09D 133/08* (2013.01); *C08K 5/3415* (2013.01); *C08K 5/3432* (2013.01); *C08K 5/3492* (2013.01); *C08K 5/43* (2013.01); *C08K 5/55* (2013.01)

(58) Field of Classification Search
None
See application file for complete search history.

(56) References Cited

U.S. PATENT DOCUMENTS

| | | |
|---|---|---|
| 7,893,047 B2 | 2/2011 | Waldron et al. |
| 8,840,910 B2 | 9/2014 | Masuda et al. |
| 8,936,854 B2 | 1/2015 | Ehara et al. |
| 9,133,347 B2 | 9/2015 | Di Lullo et al. |
| 2002/0011177 A1 | 1/2002 | Yamamori et al. |
| 2009/0017135 A1 | 1/2009 | Kempen |
| 2009/0093443 A1 | 4/2009 | Kempen et al. |
| 2011/0123478 A1 | 5/2011 | Dahling |
| 2012/0202080 A1 | 8/2012 | Ehara et al. |

FOREIGN PATENT DOCUMENTS

| | | | |
|---|---|---|---|
| CN | 102617795 A | 8/2012 | |
| CN | 102791812 A | 11/2012 | |
| CN | 102933665 A | 2/2013 | |
| CN | 103608416 A | 2/2014 | |
| CN | 102575126 B | 8/2014 | |
| EP | 2551309 A1 * | 1/2013 | ............ A01N 43/50 |
| EP | 2725076 A1 | 4/2014 | |
| JP | 9-194790 | 7/1997 | |
| JP | 2000-234072 A | 8/2000 | |
| JP | 2002-241676 A | 8/2002 | |
| JP | 2008-291141 A | 12/2008 | |
| JP | 2009-525307 A | 7/2009 | |
| JP | 2009-528356 A | 8/2009 | |
| JP | 2009-533384 A | 9/2009 | |
| JP | 2010-150355 A | 7/2010 | |
| JP | 2011-523969 A | 8/2011 | |
| SG | 185477 | 1/2013 | |

(Continued)

OTHER PUBLICATIONS

International Search Report dated Sep. 2, 2014, in PCT/JP2014/063434 filed May 21, 2014.

(Continued)

*Primary Examiner* — Susan T Tran
(74) *Attorney, Agent, or Firm* — Oblon, McClelland, Maier & Neustadt, L.L.P.

(57) ABSTRACT

The present invention relates to an antifouling coating composition, an antifouling coating film, a substrate with an antifouling coating film and a production process for the substrate. The antifouling coating composition includes a hydrolyzable polymer (A) having a structural unit represented by the following formula (1) and having a weight-average molecular weight of 1000 to 5000 and an antifouling agent (B) including (b1) 4-bromo-2-(4-chlorophenyl)-5-(trifluoromethyl)-1H-pyrrole-3-carbonitrile, and has a volatile organic compound (VOC) content of not more than 400 g/L.

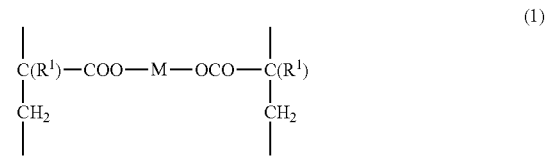

(1)

[In the formula (1), M represents zinc or copper, and $R^1$ independently represents a hydrogen atom or a methyl group.]

13 Claims, 1 Drawing Sheet

(56) References Cited

FOREIGN PATENT DOCUMENTS

| WO | WO 2006/016625 | 2/2006 |
| WO | WO 2011/046086 A1 | 4/2011 |
| WO | WO 2011/118526 A1 | 9/2011 |
| WO | WO 2011/158358 A1 | 12/2011 |
| WO | WO 2011/162129 A1 | 12/2011 |
| WO | WO 2012/084758 A1 | 6/2012 |
| WO | WO2012/176809 A1 | 12/2012 |

OTHER PUBLICATIONS

Office Action dated Nov. 8, 2016 in Japanese Patent Application No. 2015-518271.
Combined Office Action and Search Report dated Nov. 15, 2016 in Chinese Patent Application No. 201480029447.X (with English translation of category of cited documents).

* cited by examiner

ANTIFOULING COATING COMPOSITION, ANTIFOULING COATING FILM, SUBSTRATE WITH ANTIFOULING COATING FILM, AND PRODUCTION PROCESS FOR THE SUBSTRATE

TECHNICAL FIELD

The present invention relates to an antifouling coating composition, an antifouling coating film, a substrate with an antifouling coating film, and a production process for the substrate. More particularly, the present invention relates to an antifouling coating composition capable of forming coating films which can impart excellent antifouling properties, etc. to substrate surfaces of ships, underwater structures, fishing gears and the like and are excellent in damage resistance, while being decreased in the volatile organic compound (VOC) quantity to reduce a burden on the environment or an effect on a human body, an antifouling coating film formed from the antifouling coating composition, a substrate with an antifouling coating film, and a production process for the substrate.

BACKGROUND ART

Substrates such as ships, underwater structures and fishing nets can be exposed to water for a long period of time, various aquatic creatures, e.g., animals such as oyster, mussel and barnacle, plants, such as laver, and bacteria are liable to adhere to the surfaces of the substrates. For example, if these aquatic creatures adhere to a ship surface and propagate thereon, the surface roughness of the ship is increased to may cause lowering of velocity of the ship and deterioration of the fuel cost. Moreover, there is a fear that an anticorrosion coating film formed on a ship surface is damaged to thereby do damages, such as lowering of strength or functions of the ship and marked shortening of a life. On this account, an antifouling coating film has been provided on a substrate surface in the past for the purpose of preventing adhesion of aquatic creatures.

The antifouling coating film is required to have properties, such as high antifouling properties and stable coating film consumption degree, over a long period of time. As an antifouling coating composition capable of forming such an antifouling coating film, a composition containing, as an antifouling agent, 4-bromo-2-(4-chlorophenyl)-5-(trifluoromethyl)-1H-pyrrole-3-carbonitrile is known (patent literatures 1 and 2).

In addition to the above-mentioned properties, further, it becomes also an important problem of the antifouling coating film that the volatilization quantity of volatile organic compounds (also referred to as "VOC" (Volatile Organic Compounds) hereinafter) is decreased during formation of the coating film, taking into consideration the recent environmental problem and the effect on a human body and the like.

CITATION LIST

Patent Literature

Patent literature 1: WO 2011/118526
Patent literature 2: JP-A-2010-150355

SUMMARY OF INVENTION

Technical Problem

Conventional antifouling coating compositions have needed to use a large amount of a solvent in order to make the viscosity suitable for coating, and therefore, the quantity of VOC in the compositions has to be increased in order to put them into practical use, so that it cannot be said that these compositions are preferred for the environment, etc. For example, if a molecular weight of a resin that can be contained in an antifouling coating composition is decreased in order to lower the viscosity of the composition, a composition suitable for coating tends to be able to be obtained even if the quantity of the organic solvent is small. In this case, however, the coating film consumption rate in the initial stage is excessively increased, and thereafter, the coating film consumption rate is decreased, so that a coating film having stable coating film consumption degree and stable antifouling coating properties over a long period of time tends to be unable to be obtained.

Thus, there is a trade-off relationship between lowering of the quantity of VOC in an antifouling coating composition, and long-lasting stable coating film consumption degree and high antifouling properties of an antifouling coating film obtained from the composition. Hence, an antifouling coating composition having these properties that are compatible with each other has been desired.

Furthermore, in the case of, for example, a ship surface, its surface roughness has been sometimes increased or an anticorrosion coating film formed on the ship surface has been sometimes damaged because of collision with the surface of the sea and suspended matters in the seawater, or a damage due to a block used in shipbuilding, or a damage due to a fender installed on a quay wall. On this account, damage resistance and the like are also required for an antifouling coating film formed on a ship surface.

Conventional antifouling coating compositions such as an antifouling coating composition described in the patent literature 2 had poor coating film drying properties, and it was not easy to form antifouling coating films excellent in damage resistance.

The present invention has been made in the light of the above problems, and it is an object of the present invention to provide an antifouling coating composition having a low VOC content and capable of forming an antifouling coating film which is excellent in damage resistance and has stable coating film consumption degree and high antifouling properties over a long period of time.

Solution to Problem

The present inventors have earnestly studied solutions to the above problems. As a result, they have found that the above problems can be solved by an antifouling coating composition containing specific polymer and antifouling agent and having a VOC content of not higher than a specific value, and they have completed the present invention. The constitution of the present invention is as follows.

[1] An antifouling coating composition comprising:
a hydrolyzable polymer (A) having a structural unit represented by the following formula (1) and having a weight-average molecular weight of 1000 to 5000, and
an antifouling agent (B) containing (b1) 4-bromo-2-(4-chlorophenyl)-5-(trifluoromethyl)-1H-pyrrole-3-carbonitrile,
the antifouling coating composition having a volatile organic compound (VOC) content of not more than 400 g/L,

[Chem. 1]

(1)

wherein M represents zinc or copper, and R¹ independently represents a hydrogen atom or a methyl group.

[2] The antifouling coating composition as stated in [1], which has a viscosity (KU value), as measured by a Stormer viscometer, of 85 to 100.

[3] The antifouling coating composition as stated in [1] or [2], wherein the content of the antifouling agent (b1) is 1 to 20 parts by weight based on 100 parts by weight (solids content) of the antifouling coating composition.

[4] The antifouling coating composition as stated in any one of [1] to [3], wherein the antifouling agent (B) further contains at least one antifouling agent (b2) selected from the group consisting of zinc pyrithione, copper pyrithione, 4,5-dichloro-2-n-octyl-4-isothiazolin-3-one, triphenylboron.amine complex, 2-methylthio-4-tert-butylamino-6-cyclopropyl-s-triazine, N,N-dimethyl-N'-phenyl-N'-(fluorodichloromethylthio)sulfamide and N,N-dimethyl-N'-tolyl-N'-(fluorodichloromethylthio)sulfamide.

[5] The antifouling coating composition as stated in [4], wherein the content of the antifouling agent (b2) is 1 to 20 parts by weight based on 100 parts by weight (solids content) of the antifouling coating composition.

[6] The antifouling coating composition as stated in any one of claims 1 to 5, further comprising zinc oxide in an amount of 0.1 to 60 parts by weight based on 100 parts by weight (solids content) of the antifouling coating composition.

[7] The antifouling coating composition as stated in any one of [1] to [6], wherein the polymer (A) has a constituent unit derived from a monomer (a1) represented by the formula (2): $CH_2=C(R^1)-COO-M-O-CO-C(R^1)=CH_2$ [in the formula (2), M represents zinc or copper, and R¹ independently represents a hydrogen atom or a methyl group] and a constituent unit derived from another unsaturated monomer (a2) capable of being copolymerized with the monomer (a1).

[8] The antifouling coating composition as stated in [7], wherein the monomer (a1) contains at least one monomer selected from the group consisting of zinc diacrylate, zinc dimethacrylate, copper diacrylate and copper dimethacrylate.

[9] The antifouling coating composition as stated in [7] or [8], wherein the unsaturated monomer (a2) contains at least one unsaturated monomer selected from the group consisting of alkyl (meth)acrylate, alkoxyalkyl (meth)acrylate and hydroxyalkyl (meth)acrylate.

[10] The antifouling coating composition as stated in any one of [1] to [9], wherein the content of zinc and/or copper in the polymer (A) is 0.5 to 25% by weight of the polymer (A).

[11] An antifouling coating film formed from the antifouling coating composition as stated in any one of [1] to [10].

[12] A substrate with an antifouling coating film, the substrate having been coated with the antifouling coating film as stated in [11].

[13] A production process for a substrate with an antifouling coating film, comprising the steps of: forming a coating film made from the antifouling coating composition as stated in any one of [1] to [10]; and curing the coating film.

Advantageous Effects of Invention

According to the present invention, a high solid hydrolyzable antifouling coating composition which suppresses a burden on the environment and an effect on a human body low, is excellent in coating workability and drying properties though it has a low VOC content, and can form an antifouling coating film that is excellent in stable coating film consumption degree and high antifouling properties and mechanical strength (damage resistance) with a good balance over a long period of time can be provided.

According to the present invention, further, fouling of substrates such as underwater structures, ships and fishing gears can be prevented over a long period of time.

DESCRIPTION OF EMBODIMENTS

[Antifouling Coating Composition]

The antifouling coating composition (also referred to as a "composition" simply hereinafter) of the present invention comprises:

a hydrolyzable polymer (A) having a structural unit represented by the following formula (1) (also referred to as a "structural unit (1)" hereinafter) and having a weight-average molecular weight of 1000 to 5000, and an antifouling agent (B) containing (b1) 4-bromo-2-(4-chlorophenyl)-5-(trifluoromethyl)-1H-pyrrole-3-carbonitrile (also referred to as an "antifouling agent (b1)" hereinafter), and has a volatile organic compound (VOC) content of not more than 400 g/L.

[Chem. 2]

[In the formula (1), M represents zinc or copper, and R¹ independently represents a hydrogen atom or a methyl group.]

Such a composition of the present invention becomes a high solid hydrolyzable antifouling coating composition which suppresses a burden on the environment and an effect on a human body low, is excellent in coating workability and drying properties though it has a low VOC content, and can form an antifouling coating film that is excellent in stable coating film consumption degree, high antifouling properties and mechanical strength (damage resistance) with a good balance over a long period of time.

As previously described, conventional antifouling coating compositions have needed to use a large amount of a solvent in order to make the viscosity suitable for coating, and therefore, the quantity of VOC in the compositions has to be increased in order to put them into practical use, so that it cannot be said that these compositions are preferred for the environment, the human body, etc. For example, if a molecular weight of a resin that can be contained in an antifouling coating composition is decreased in order to lower the viscosity of the composition, a composition suitable for coating tends to be able to be obtained even if the quantity of the organic solvent is small. In this case, however, the coating film consumption rate in the initial stage is excessively increased, and thereafter, the coating film consumption rate is decreased, so that a coating film having stable coating film consumption degree and stable antifouling coating properties over a long period of time tends to be unable to be obtained.

The reason is thought to be that a hydrolyzable portion of a resin contained in the antifouling coating composition is dissolved first, and a portion having no hydrolyzability remains.

On the other hand, the composition of the present invention is a composition that has a low viscosity even if the content of VOC is low, and is a composition capable of forming an antifouling coating film having stable coating film consumption degree and high antifouling properties over a long period of time. These effects can be attained only when specific polymer (A) and antifouling agent (b1) are contained.

The composition of the present invention has a low viscosity in spite of a low VOC content, as previously described, and therefore, an antifouling coating film can be formed on a substrate by various methods. Particularly, according to the composition of the present invention, spray coating that is preferably adopted when an antifouling coating film is formed on a substrate such as a ship, an underwater structure and a fishing gear can be easily carried out.

Further, the composition of the present invention is a high solid coating composition, and therefore, coating can be carried out with hardly changing the coating conditions and the coating environment from those for the conventional solvent type coating materials, and even if coating facilities, etc. are not altered, coating becomes possible while taking the environment and the human body into consideration.

Furthermore, the composition of the present invention has good drying properties. When sections of a coated hull are put into a dock for the purpose of new shipbuilding or the like, the sections of the hull are usually supported by blocks, and even in such a case, owing to the good drying properties, an antifouling coating film formed from the composition of the present invention on a ship surface hardly suffers occurrence of depression or protrusion at the portion that is in contact with the block, and is hardly damaged. Moreover, after a ship having been docked and subjected to coating is undocked, the ship sometimes comes into contact with a fender or the like installed on the quay wall, and even in such a case, an antifouling coating film formed from the composition of the present invention on a ship surface is hardly damaged by the fender or the like.

<Hydrolyzable Polymer (A)>

The hydrolyzable polymer (A) has a structural unit (1) and has a weight-average molecular weight (Mw) of 1000 to 5000.

The polymer (A) exhibits hydrolyzability at least in an alkali atmosphere such as seawater. Since the composition of the present invention contains such a polymer (A) and an antifouling agent (b1), it has a low viscosity while having a low VOC content, is excellent in drying properties and becomes a high solid hydrolyzable antifouling coating composition capable of forming an antifouling coating film that is excellent in stable coating film consumption degree, damage resistance, coating film properties (e.g., crack resistance, adhesion to substrate) and surface smoothness with a good balance over a long period of time.

The polymer (A) is desirably a polymer containing the structural unit (1) preferably in an amount of 1 to 50% by weight, more preferably 10 to 30% by weight, based on the whole polymer (100% by weight), from the viewpoint that an antifouling coating film that is excellent in stable coating film consumption degree, damage resistance and coating film properties (e.g., crack resistance, adhesion to substrate) with a good balance over a long period of time can be obtained, and other viewpoints.

The polymer having the structural unit (1) can be obtained by, for example, using the following monomer (a1) as its synthesis raw material. The amount of the structural unit (1) in the polymer can be calculated from, for example, the amount of the monomer (a1) used. The polymer containing the structural unit (1) in an amount of the above range can be obtained by, for example, properly controlling the amount of the monomer (a1) used.

The content of zinc and/or copper in the polymer (A) is preferably 0.5 to 25% by weight, more preferably 1 to 20% by weight, of the polymer (A) (i.e., in 100% by weight of the polymer (A)), from the viewpoint that an antifouling coating film that is excellent in stable coating film consumption degree and coating film properties (e.g., crack resistance, adhesion to substrate) with a good balance over a long period of time can be obtained, and other viewpoints. Here, the "content of zinc and/or copper" means the total content of zinc and copper when both of zinc and copper are contained.

The content of zinc and/or copper can be measured by the use of an ICP emission analysis apparatus, and can be controlled by the type and the amount of a metal-containing compound used for the preparation of the polymer (A).

The polymer (A) is preferably a copolymer having a constituent unit derived from a monomer (a1) represented by the formula (2): $CH_2=C(R^1)-COO-M-O-CO-C(R^1)=CH_2$ [in the formula (2), M represents zinc or copper, and $R^1$ independently represents a hydrogen atom or a methyl group] and a constituent unit derived from another unsaturated monomer (a2) capable of being copolymerized with the monomer (a1).

The monomer (a1) and the unsaturated monomer (a2) may be each used singly or in combination of two or more kinds.

As the monomer (a1), at least one monomer selected from the group consisting of zinc diacrylate, zinc dimethacrylate, copper diacrylate and copper dimethacrylate is preferably contained.

Such a monomer (a1) can be prepared by a publicly known process such as a process comprising heating and stirring an inorganic metal compound (oxide, hydroxide, chloride or the like of zinc or copper) and (meth)acrylic acid or its ester compound at a temperature of not higher than the decomposition temperature of the monomer (a1) in the presence of an organic solvent such as an ether organic solvent and water.

As the unsaturated monomer (a2), at least one unsaturated monomer selected from the group consisting of alkyl (meth)acrylate, alkoxyalkyl (meth)acrylate and hydroxyalkyl (meth)acrylate is preferably contained, and of these, particularly preferable is methyl (meth)acrylate, ethyl (meth)acrylate, butyl (meth)acrylate, 2-methoxyethyl (meth)acrylate, 3-methoxybutyl (meth)acrylate, 2-hydroxyethyl (meth)acrylate or the like.

The copolymer can be produced by a hitherto publicly known process, and as such a process, a process disclosed in JP-A-2000-234072 can be mentioned.

The copolymer may be a copolymer produced by polymerizing a monomer mixture at a temperature of not lower than 110° C. in a pressurized vessel having been pressurized so that water should not be refluxed. In the case where an antifouling coating film formed from a composition containing a copolymer thus produced is formed on a ship, excellent performance of the coating film can be maintained without lowering of self-polishing properties of the coating film even if the ship is run at a low speed.

The monomer (a1) for use in the synthesis of the copolymer is preferably used in such an amount that the amount of the structural unit (1) and the content of zinc and/or copper in the resulting polymer become in the aforesaid ranges, and specifically, the amount of the monomer (a1) used is preferably 1 to 50% by mol, more preferably 5 to 30% by mol, based on 100% by mol of all of the monomers used for synthesizing the copolymer.

The amount of the monomer (a2) for use in the synthesis of the copolymer is preferably 50 to 99% by mol, more preferably 70 to 95% by mol, based on 100% by mol of all of the monomers used for synthesizing the copolymer.

The weight-average molecular weight (Mw, value in terms of polystyrene) of the polymer (A) is preferably 1500 to 5000, more preferably 2000 to 4500, from the viewpoint that a composition that has a lower viscosity while having a low VOC content can be obtained, and other viewpoints.

The number-average molecular weight (Mn, value in terms of polystyrene) of the polymer (A) can be properly controlled taking viscosity and storage stability of the composition, elution rate of the antifouling coating film, etc. into consideration, but it is preferably 1000 to 3000, more preferably 1000 to 2500.

The above molecular weights can be measured by gel permeation chromatography (GPC), and specifically, they can be measured by a method described in the working examples mentioned below.

The Gardner viscosity (25° C.) of the polymer (A) is preferably about L to Z, more preferably about O to W, from the viewpoint that a composition that has a low viscosity while having a low VOC content and has excellent coating workability can be obtained, and other viewpoints.

The composition of the present invention contains the polymer (A) preferably in an amount of 1 to 50 parts by weight, more preferably 3 to 40 parts by weight, still more preferably 5 to 35 parts by weight, in 100 parts by weight of the composition (solids content), from the viewpoint that a composition that is excellent in coating workability and drying properties while having a low VOC content and can form an antifouling coating film that is excellent in stable coating film consumption degree, high antifouling properties and mechanical strength (damage resistance) with a good balance over a long period of time is obtained, and other viewpoints.

The polymer (A) may be used singly or in combination of two or more kinds.

<Antifouling Agent (B)>

The composition of the present invention contains an antifouling agent (b1) as the antifouling agent (B).

Since the composition of the present invention contains such an antifouling agent (b1), an antifouling coating film that is excellent in stable coating film consumption degree, high antifouling properties and mechanical strength (damage resistance) with a good balance over a long period of time can be formed even if a polymer having low Mw is used.

The present inventors have found that by combining the antifouling agent (b1) with the polymer (A), viscosity of a mixture of them is greatly lowered and it can be suppressed that a hydrolyzable portion of a resin contained in the antifouling coating composition is dissolved first and a portion having no hydrolyzability remains, and therefore, a composition having the above effects has been able to be obtained.

Since the composition of the present invention contains the antifouling agent (b1), use of copper suboxide that has been heretofore used in a large amount can be completely eliminated, or the amount thereof can be drastically reduced, whereby it becomes possible to make the hydrolysis rate of the antifouling coating film containing the polymer (A) almost constant.

Further, by virtue of non-use or reduction of copper suboxide, specific gravity of the antifouling coating composition can be decreased, and corrosion of a substrate caused by copper suboxide can be suppressed. Therefore, irrespective of a material of a substrate, a desired substrate can be selected and used. Moreover, by virtue of non-use or reduction of copper suboxide, color of the resulting antifouling coating film can be controlled.

The content of the antifouling agent (b1) in the composition of the present invention is not specifically restricted as long as it is in a range exerting no evil influence on the properties of the resulting coating film, but from the viewpoint that an antifouling coating film excellent in long-term antifouling properties is obtained, and other viewpoints, the content thereof is preferably 1 to 20 parts by weight, more preferably 1 to 15 parts by weight, still more preferably 2 to 15 parts by weight, based on 100 parts by weight of the composition (solids content) of the present invention.

The composition of the present invention exhibits excellent antifouling properties, etc. because it contains the antifouling agent (b1) as the antifouling agent (B), but in order to further enhance antifouling properties, particularly alga resistance (prevention of adhesion of algae, etc.), another antifouling agent (b2) may be contained, when needed.

The antifouling agent (b2) is not specifically restricted, but preferred examples thereof include zinc pyrithione, copper pyrithione, 4,5-dichloro-2-n-octyl-4-isothiazolin-3-one, triphenylboron.amine complex, 2-methylthio-4-tert-butylamino-6-cyclopropyl-s-triazine, N,N-dimethyl-N'-phenyl-N'-(fluorodichloromethylthio)sulfamide and N,N-dimethyl-N'-tolyl-N'-(fluorodichloromethylthio)sulfamide.

Of these, zinc pyrithione and 4,5-dichloro-2-n-octyl-4-isothiazolin-3-one (e.g., SEANINE 211N (manufactured by Rohm and Haas Japan K.K.)) are more preferable from the viewpoint that an antifouling coating film having more excellent antifouling properties is obtained, and other viewpoints, and zinc pyrithione is particularly preferable from the viewpoint that a composition excellent also in coating film drying properties is obtained, and other viewpoints.

These antifouling agents (b2) may be used singly, or may be used in combination of two or more kinds.

The content of the antifouling agent (b2) in the composition of the present invention is not specifically restricted as long as it is in a range exerting no evil influence on the properties of the resulting coating film, but from the viewpoint that an antifouling coating film excellent in long-term antifouling properties is obtained, and other viewpoints, the content thereof is preferably 0.1 to 20 parts by weight, more preferably 0.1 to 15 parts by weight, still more preferably 0.1 to 12 parts by weight, based on 100 parts by weight of the composition (solids content) of the present invention.

The content of the antifouling agent (b2) is preferably 10 to 1000 parts by weight, more preferably 20 to 500 parts by weight, still more preferably 20 to 400 parts by weight, based on 100 parts by weight of the antifouling agent (b1).

The content of the antifouling agents (b1) and (b2) in the composition of the present invention is not specifically restricted as long as it is in a range exerting no evil influence on the properties of the resulting coating film, but from the viewpoint that an antifouling coating film excellent in antifouling properties, etc. is obtained, and other viewpoints, the content thereof is preferably 1 to 40 parts by weight, more preferably 1 to 30 parts by weight, still more preferably 1 to 22 parts by weight, based on 100 parts by weight of the composition (solids content) of the present invention.

<Zinc Oxide>

The composition of the present invention preferably contains zinc oxide from the viewpoint that an antifouling coating film excellent in stable consumption properties, high antifouling properties, damage resistance, etc. is obtained, and other viewpoints.

When the composition of the present invention contains zinc oxide, the content of zinc oxide is preferably 0.1 to 60 parts by weight, more preferably 1 to 50 parts by weight, still more preferably 3 to 50 parts by weight, based on 100 parts by weight of the composition (solids content) of the present invention.

<Other Components>

In the composition of the present invention, various components used in general coating compositions, such as colorant, extender pigment, dehydrating agent, plasticizer, thixotropic agent, solvent, resin, and organic compound (e.g., organic acid), can be compounded in addition to the aforesaid components. These may be each used singly, or may be each used in combination of two or more kinds.

Colorant

Examples of the colorants include color pigments (e.g., inorganic pigments, such as red iron oxide, titanium white (titanium oxide) and yellow iron oxide, organic pigments, such as carbon black, naphthol red and phthalocyanine blue) and dyes.

Although the amount of the colorant compounded can be properly controlled, it is preferably 0.1 to 20 parts by weight, more preferably 0.5 to 10 parts by weight, based on 100 parts by weight of the composition (solids content) of the present invention.

Extender Pigment

The extender pigment is such a pigment as has a low refractive index and is so transparent that it does not hide the coated surface when it is kneaded with oil or varnish. Examples of the extender pigments include talc, silica, mica, clay, potash feldspar, calcium carbonate, kaolin, alumina white, white carbon, aluminum hydroxide, magnesium carbonate, barium carbonate, barium sulfate and zinc sulfide. Of these, talc, silica, mica, clay, potash feldspar and barium sulfate are preferable. Although the amount of the extender pigment compounded can be properly controlled, it is preferably 0.1 to 60 parts by weight, more preferably 1 to 50 parts by weight, particularly preferably 5 to 45 parts by weight, based on 100 parts by weight of the composition (solids content) of the present invention. Calcium carbonate, kaolin and alumina white can each function also as an anti-settling agent, and white carbon, aluminum hydroxide, magnesium carbonate, barium carbonate, barium sulfate and zinc sulfide can each function also as a flatting agent.

In the composition of the present invention, the amount of the pigments (color pigment+extender pigment) compounded is preferably 1 to 6000 parts by weight, more preferably 5 to 5000 parts by weight, based on 100 parts by weight of the polymer (A) (heating residue), from the viewpoint that an antifouling coating film excellent in antifouling properties, crack resistance, etc. is obtained, and other viewpoints.

Dehydrating Agent

The dehydrating agent is a component that contributes to improvement in storage stability of the composition of the present invention.

Examples of the dehydrating agents include inorganic dehydrating agents, such as anhydrous gypsum, hemihydrate gypsum (calcined gypsum) and synthetic zeolite adsorbent (e.g., "Molecular Sieves" (trade name)), and other dehydrating agents, such as ortho esters (methyl orthoformate, methyl orthoacetate, orthoboric acid ester, etc.), silicates and isocyanates. Of these, anhydrous gypsum and hemihydrate gypsum (calcined gypsum) that are inorganic dehydrating agents are preferable.

Although the amount of the dehydrating agent compounded can be properly controlled, it is preferably 0 to 10 parts by weight, more preferably 0.5 to 5 parts by weight, based on 100 parts by weight of the composition (solids content) of the present invention.

Plasticizer

The plasticizer is a component that contributes to improvement in crack resistance and water resistance of the antifouling coating film and suppression of discoloration thereof.

Examples of the plasticizers include n-paraffin, chlorinated paraffin, terpene phenol, tricresyl phosphate (TCP) and polyvinyl ethyl ether. Of these, chlorinated paraffin and terpene phenol are preferable, and chlorinated paraffin is particularly preferable.

As n-paraffin, commercial products such as "n-Paraffin" manufactured by Nippon Petrochemicals Co., Ltd. can be mentioned. As chlorinated paraffin, commercial products such as "Toyoparax A-40/A-50/A-70/A-145/A-150" manufactured by Tosoh Corporation can be mentioned.

The amount of the plasticizer compounded can be properly controlled, but for example, it is 1 to 5% by weight based on the whole solids content in the composition of the present invention.

Thixotropic Agent

Examples of the thixotropic agents (anti-sagging/anti-settling agents) include organic clay compounds (e.g., amine salt, stearate salt, lecithin salt or alkyl sulfonate salt of Al, Ca or Zn), organic waxes (polyethylene wax, polyethylene oxide wax, polyamide wax, amide wax, hydrogenated castor oil wax, etc.) and synthetic finely divided silica. Of these, organic clay compounds, polyamide wax, polyethylene oxide wax and synthetic finely divided silica are preferable.

The amount of the thixotropic agent compounded can be properly controlled, but for example, it is 0.1 to 5 parts by weight based on 100 parts by weight of the composition (solids content) of the present invention.

Organic Compound

The composition of the present invention may contain organic compounds such as resins and organic acids when needed, in addition to the polymer (A).

Examples of the resins include water-insoluble or slightly water-soluble resins, such as acrylic resin, acrylic silicone resin, polyester resin, unsaturated polyester resin, fluororesin, polybutene resin, silicone rubber, polyurethane resin, epoxy resin, polyamide resin, vinyl resin (vinyl chloride copolymer, ethylene/vinyl acetate copolymer or the like), chlorinated rubber, chlorinated olefin resin, styrene/butadiene copolymer resin, ketone resin, alkyd resin, coumarone resin, terpene phenol resin, petroleum resin, pine tar, and rosin (gum rosin, wood rosin, tall oil rosin).

Examples of the organic acids include monobasic organic acids, such as naphthenic acid, versatic acid and triphenyl isobutenyl cyclohexene carboxylic acid (e.g., "A-3000" manufactured by Yasuhara Chemical Co., Ltd.).

Solvent

It is preferable that various components to constitute the composition of the present invention have been dissolved or dispersed in solvents similarly to those of usual antifouling coating compositions. In the present invention, solvents generally used as those for antifouling coating materials, such as aliphatic solvents, aromatic solvents (xylene, toluene, etc.), ketone solvents (methyl isobutyl ketone, cyclohexanone, etc.), ester solvents, ether solvents (propylene glycol monomethyl ether, propylene glycol monomethyl ether acetate, etc.) and alcohol solvents (isopropyl alcohol, etc.), can be used.

If necessary, a solvent may be further added at a coating site according to the workability.

<Preparation Process for Antifouling Coating Composition, Etc.>

The composition of the present invention can be prepared by using an apparatus, means, etc. that are the same as those for publicly known general antifouling coating materials. For example, the polymer (A) is synthesized in advance, and thereafter, this polymer (reaction solution), an antifouling agent, and if necessary, zinc oxide and other components are added at a time or in order, and then, they are stirred and mixed, whereby the composition can be prepared.

The composition of the present invention can be used in the same embodiments as those of publicly known general antifouling coating materials.

<Properties of Antifouling Coating Composition, Etc.>

The composition of the present invention preferably contains VOC so that the composition prepared under such conditions as make the ratio between the polymer (A) and the pigment be in the aforesaid range may become a composition having excellent coating properties (i.e., coating is possible without further addition of a solvent), and the VOC content in the composition of the present invention is more preferably not more than 390 g/L.

By setting the VOC content in the composition of the present invention to not more than 400 g/L, a burden on the environment and an effect on a human body can be reduced. The composition having a VOC content in the above range can be obtained by, for example, controlling the solvent quantity capable of being added to the composition of the present invention, and the VOC content can be measured by, for example, a method described in the working examples mentioned below.

The amounts of the components other than the solvent in the composition of the present invention are determined according to, for example, the intended use, while taking the properties of the resulting antifouling coating film, etc. into consideration, and thereafter, the amount of the solvent is determined so that coating with the resulting composition may become possible without further addition of a solvent. Of such compositions, preferable is a composition containing a minimum necessary quantity of a solvent and having a VOC content in the above range.

The viscosity (KU value) of the composition of the present invention, as measured by a Stormer viscometer, is preferably 85 to 100, more preferably 85 to 98, still more preferably 85 to 95. A composition having a viscosity in the above range indicates that its viscosity is low, and therefore, the composition of the present invention having such a viscosity has a low viscosity in spite that it has a low VOC content. Hence, the composition having a viscosity in the above range gives little burden on the environment and little effect on a human body, is excellent in coating workability and drying properties and is easily applicable to spray coating and the like.

Further, when the composition having a viscosity in the above range is applied to a substrate using an applicator or the like, the composition is excellent not only in coating properties but also in retentivity on the substrate, and therefore, it can easily form an antifouling coating film on the substrate by various methods.

[Antifouling Coating Film, Substrate with Antifouling Coating Film, and Production Process for the Substrate]

The antifouling coating film of the present invention is formed from the above-mentioned composition of the present invention.

The antifouling coating film of the present invention can be formed in, for example, the following manner. A coating film made from the composition of the present invention is formed on a substrate, particularly on a substrate that always or intermittently comes into contact with seawater, fresh water or the like, such as an underwater structure, a ship or a fishing gear, and the coating film is cured to form an antifouling coating film on the substrate (substrate with an antifouling coating film).

The process for producing a substrate with an antifouling coating film is not specifically restricted, but there can be mentioned a process comprising the steps of: forming a coating film made from the composition of the present invention on a substrate by a method of coating the substrate with the composition of the present invention through a hitherto publicly known technique, a method of immersing the substrate in the composition of the present invention, or the like; and curing the coating film.

The coating method is not specifically restricted because the composition of the present invention can be applied onto a substrate by various techniques, but spray coating is preferable.

By coating the surface of the substrate with the antifouling coating film, fouling of the substrate by aquatic creatures and the like can be prevented over a long period of time. Although the (dry) film thickness of the antifouling coating film can be properly controlled taking a consumption rate of the coating film, etc. into consideration, but it is enough just to set the film thickness to, for example, about 40 to 400 μm, preferably about 40 to 200 μm.

EXAMPLES

The present invention will be more concretely described with reference to the following examples, but it should be construed that the present invention is in no way limited to those examples. In the following examples and comparative examples, "part (s)" means part (s) by weight, and "%" indicating a solids content means % by weight, as long as they are not contrary to the spirit of the present invention.

<Solids Content>

In the present invention, the term solids content refers to a heating residue given when a component containing a solvent and the like is dried in a hot air dryer at 105° C. for 3 hours to evaporate the solvent and the like.

<Measurement of Weight-Average Molecular Weight (Mw) and Number-Average Molecular Weight (Mn)>

Mw and Mn of a polymer in each hydrolyzable polymer composition obtained in the following production examples were measured by a gel permeation chromatography (GPC) technique using, as a measuring device, "HLC-8120GPC" manufactured by Tosoh Corporation, using two separation columns (α-M) of "TSK-gel α type" manufactured by Tosoh Corporation and using, as an eluent, dimethylformamide (DMF) to which 20 mM of LiBr had been added, and they were determined as values in terms of polystyrene.

<Measuring Conditions for Gardner Viscosity>

Gardner viscosity of a polymer in each hydrolyzable polymer composition obtained in the following production examples was measured at 25° C.

Preparation Example 1 (Preparation of Metal Atom-Containing Polymerizable Monomer Mixture (a-1))

In a four-neck flask equipped with a condenser, a thermometer, a dropping funnel and a stirrer, 59.9 parts of propylene glycol monomethyl ether (PGM) and 40.7 parts of zinc oxide were placed, and they were heated to 75° C. while stirring. Subsequently, a mixture composed of 43 parts of methacrylic acid, 36 parts of acrylic acid and 5 parts of water was dropwise added from the dropping funnel at a constant rate over a period of 3 hours. After completion of the dropwise addition, stirring was further carried out for 2 hours, and thereafter, 29.4 parts of PGM were added to obtain a transparent metal atom-containing polymerizable monomer mixture (a-1). The solids content was 55.1%.

Preparation Example 2 (Preparation of Metal Atom-Containing Polymerizable Monomer Mixture (a-2))

In a four-neck flask equipped with a condenser, a thermometer, a dropping funnel and a stirrer, 85.4 parts of PGM and 40.7 parts of zinc oxide were placed, and they were heated to 75° C. while stirring. Subsequently, a mixture composed of 43.1 parts of methacrylic acid, 36.1 parts of acrylic acid and 5 parts of water was dropwise added from the dropping funnel at a constant rate over a period of 3 hours. After completion of the dropwise addition, stirring was further carried out for 2 hours, and thereafter, 36 parts of PGM were added to obtain a transparent metal atom-containing polymerizable monomer mixture (a-2). The solids content was 44.8%.

Production Example 1

Production of Hydrolyzable Copolymer Composition (A-1)

In an autoclave capable of pressure polymerization and equipped with a condenser, a thermometer, a dropping tank and a stirrer, 10 parts of PGM, 35 parts of xylene and 4 parts of ethyl acrylate were placed, and the autoclave was pressurized to 350 kPa and heated to 135° C. while stirring the contents. Subsequently, a transparent mixture composed of 15 parts of methyl methacrylate, 48 parts of ethyl acrylate, 15 parts of n-butyl acrylate, 40 parts of the metal atom-containing polymerizable monomer mixture (a-1), 10 parts of xylene, 1.8 parts of a chain transfer agent (Nofmer MSD manufactured by NOF Corporation), 4 parts of 2,2'-azobisisobutyronitrile (AIBN) and 2 parts of 2,2'-azobis(2-methylbutyronitrile) (AMBN) was dropwise added from the dropping tank at a constant rate over a period of 2.5 hours. After completion of the dropwise addition, the temperature was lowered to 110° C. over a period of 30 minutes, and 0.5 part of t-butyl peroctoate and 5 parts of xylene were dropwise added over a period of 30 minutes. After stirring was further carried out for 1 hour and 30 minutes, 3 parts of xylene were added. The resulting mixture was filtered through a 300-mesh filter to obtain a light yellow transparent filtrate (hydrolyzable copolymer composition (A-1)) having a heating residue of 55.3% and a Gardner viscosity R and containing no insoluble matter.

Mw of the polymer contained in the resulting hydrolyzable copolymer composition (A-1) was 3200, and Mn thereof was 1150.

Production Example 2 (Production of Hydrolyzable Copolymer Composition (A-2))

In a four-neck flask equipped with a condenser, a thermometer, a dropping funnel and a stirrer, 10 parts of PGM, 37 parts of xylene and 4 parts of ethyl acrylate were placed, and they were heated to 100° C. while stirring. Subsequently, a transparent mixture composed of 15 parts of methyl methacrylate, 52 parts of ethyl acrylate, 8 parts of n-butyl acrylate, 47 parts of the metal atom-containing polymerizable monomer mixture (a-1), 10 parts of xylene, 2 parts of a chain transfer agent (Nofmer MSD manufactured by NOF Corporation), 3 parts of AIBN and 8 parts of AMBN was dropwise added from the dropping funnel at a constant rate over a period of 2.5 hours. After completion of the dropwise addition, 0.5 part of t-butyl peroctoate and 7 parts of xylene were dropwise added over a period of 30 minutes. After stirring was further carried out for 1 hour and 30 minutes, 3 parts of xylene were added. The resulting mixture was filtered through a 300-mesh filter to obtain a light yellow transparent filtrate (hydrolyzable copolymer composition (A-2)) having a heating residue of 54.8% and a Gardner viscosity R and containing no insoluble matter.

Mw of the polymer contained in the resulting hydrolyzable copolymer composition (A-2) was 3100, and Mn thereof was 1200.

Production Example 3 (Production of Hydrolyzable Copolymer Composition (A-3))

In a four-neck flask equipped with a condenser, a thermometer, a dropping funnel and a stirrer, 15 parts of PGM and 57 parts of xylene were placed, and they were heated to 100° C. while stirring. Subsequently, a transparent mixture composed of 1 part of methyl methacrylate, 66.2 parts of ethyl acrylate, 5.4 parts of 2-methoxyethyl acrylate, 52 parts of the metal atom-containing polymerizable monomer mixture (a-2), 10 parts of xylene, 1 part of a chain transfer agent (Nofmer MSD manufactured by NOF Corporation), 2.5 parts of AIBN and 7 parts of AMBN was dropwise added from the dropping funnel at a constant rate over a period of 6 hours. After completion of the dropwise addition, 0.5 part of t-butyl peroctoate and 7 parts of xylene were dropwise added over a period of 30 minutes. After stirring was further carried out for 1 hour and 30 minutes, 4.4 parts of xylene were added. The resulting mixture was filtered through a 300-mesh filter to obtain a light yellow transparent filtrate (hydrolyzable copolymer composition (A-3)) having a heating residue of 45.6% and a Gardner viscosity-Y and containing no insoluble matter.

Mw of the polymer contained in the resulting hydrolyzable copolymer composition (A-3) was 5200, and Mn thereof was 1950.

Production Example 4 (Production of Hydrolyzable Copolymer Composition (A-4))

In a four-neck flask equipped with a condenser, a thermometer, a dropping funnel and a stirrer, 30 parts of PGM and 37 parts of xylene were placed, and they were heated to 100° C. while stirring. Subsequently, a mixture composed of 35 pars of zinc versatate methacrylate, 10 parts of 2-methoxyethyl acrylate, 30 parts of 3-methoxybutyl acrylate, 25 parts of ethyl acrylate and 10 parts of t-butyl peroxide was dropwise added from the dropping funnel at a constant rate over a period of 2 hours. After completion of the dropwise addition, 1 part of t-butyl peroctoate and 10 parts of xylene were dropwise added over a period of 2 hours. After stirring was further carried out for 2 hours, 10 parts of xylene were added. The resulting mixture was filtered through a 300-mesh filter to obtain a light yellow transparent filtrate (hydrolyzable copolymer composition (A-4) of side-chain end type) having a heating residue of 53.9% and a Gardner viscosity Y and containing no insoluble matter.

Mw of the polymer contained in the resulting hydrolyzable copolymer composition (A-4) was 3600, and Mn thereof was 1350.

Production Example 5 (Production of Hydrolyzable Copolymer Composition (A-5))

In a reaction vessel equipped with a stirrer, a condenser, a thermometer, a dropping device, a nitrogen feed pipe and a heating/cooling jacket, 80 parts of xylene were placed, and in a stream of nitrogen, heating and stirring were carried out under the temperature conditions of 85° C. While maintaining the same temperature, a mixture composed of 60 parts of triisopropylsilyl acrylate, 40 parts of methyl methacrylate and 0.3 part of AIBN was dropwise added in the reaction vessel from the dropping device over a period of 2 hours. Thereafter, stirring was carried out at the same temperature for 4 hours, then 0.4 part of AIBM was added, and stirring was further carried out at the same temperature for 3 hours to obtain a colorless transparent hydrolyzable copolymer composition (A-5) having a heating residue of 55.0% and a Gardner viscosity +Z.

Mw of the polymer contained in the resulting hydrolyzable copolymer composition (A-5) was 55350, and Mn thereof was 9500.

Examples 1 to 16, Comparative Examples 1 to 22

Components shown in Table 1 and Table 3 were mixed to prepare antifouling coating compositions. The unit of each numerical value in Tables 1 and 3 is part(s) by weight.

SEANINE 211N in Tables 1 and 3 is an antifouling agent containing 4,5-dichloro-2-n-octyl-4-isothiazolin-3-one, the antifouling agent being manufactured by Rohm and Haas Japan K.K.

<Property Evaluation of Antifouling Coating Composition>

Properties of antifouling coating compositions obtained in Examples 1 to 16 and Comparative Examples 1 to 22 and antifouling coating films formed from those compositions were evaluated as follows. The results obtained are set forth in Table 2 or 4.

(1) VOC Content

Using values of a specific gravity and a heating residue of each antifouling coating composition obtained in the examples and the comparative examples, a VOC content was calculated from the following formula.

VOC content (g/L)=specific gravity of composition×1000×(100−heating residue)/100

(2) Specific Gravity

A specific gravity cup having a volume of 100 mL was filled with each antifouling coating composition obtained in the examples and the comparative examples, and a mass of the antifouling coating composition was measured. The mass of the antifouling coating composition was divided by the volume of the specific gravity cup to calculate a specific gravity of the composition.

(3) Heating Residue

Heating residue was calculated on the basis of JIS K 5601-1-2. Specifically, 1 g of each antifouling coating composition obtained in the examples and the comparative examples was weighed into a flat bottom dish, then uniformly spread by the use of a wire of a known mass and dried at 125° C. for 1 hour. Thereafter, a mass of a residue and a mass of the wire were measured to calculate a heating residue (% by weight).

(4) Measurement of Viscosity of Antifouling Coating Composition

Viscosity (KU value) of each antifouling coating composition obtained in the examples and the comparative examples was measured under the following conditions by the use of a Stormer viscometer in accordance with the regulations of JIS K-5600-2-2.

Stormer viscometer: Stormer viscometer manufactured by Coating Tester Industry Co., Ltd.

Preset temperature: 250±0.5° C.

Amount of sample: 500 mL

Weight: 75 g to 1000 g (5) Airless Spraying Workability (Atomization Properties and Coating Film Appearance)

5000 g of each antifouling coating composition obtained in the examples and the comparative examples was allowed to stand for 60 minutes under the temperature conditions of 23° C. Then, a substrate (913 mm×718 mm×0.32 mm, tin plate) was coated with the composition having been allowed to stand, by the use of an airless spray so that the aimed wet film thickness might become 300 μm. The coating workability (atomization properties, coating film appearance) during this operation was evaluated on the basis of the following evaluation criteria.

[Evaluation Criteria of Atomization Properties]

A: When the substrate was coated with the antifouling coating composition by the use of an airless spray, the antifouling coating composition was sprayed as finely divided particles (in the form of fog), and the spray pattern was free from occurrence of streaks and the like and was a uniform pattern (atomization properties were good).

B: When the substrate was coated with the antifouling coating composition by the use of an airless spray, the antifouling coating composition was not sprayed as finely divided particles (in the form of fog), and the spray pattern was such a pattern as had streaks drawn (atomization properties were poor).

C: Coating by an airless spray was extremely difficult.

[Evaluation Criteria of Coating Film Appearance]

A: The surface of the coating film formed on the substrate did not have problems such as occurrence of fine particles, lowering of gloss and bad leveling (appearance was good).

B: The surface of the coating film formed on the substrate had problems such as occurrence of fine particles, lowering of gloss or bad leveling (appearance was poor).

C: Coating by an airless spray was extremely difficult, and a usual coating film (uniform coating film) was not formed.

(6) Damage Resistance (Coating Film Drying Properties/Pressure Test (Block Pressure Test))

A sandblasted steel plate of 150×70×3.2 mm was coated with an epoxy anticorrosion coating material ("Bannoh 500" manufactured by Chugoku Marine Paints, Ltd.) so that the dry film thickness might become 150 μm, and the coating material was dried at room temperature (about 20° C.) for one day to form a coating film. The surface of this coating film was further coated with an epoxy binder coating material ("Bannoh 500N" manufactured by Chugoku Marine Paints, Ltd.) so that the dry film thickness might become 100 μm, and the coating material was dried at room temperature (about 20° C.) for one day to form a coating film. Then, a coating film-forming operation consisting of coating the surface of the above coating film with each antifouling coating composition obtained in the examples and the comparative examples by the use of an airless spray so that the dry film thickness might become 160 μm and drying the composition at room temperature (about 20° C.) for one day was repeated twice to prepare a test plate with an antifouling coating film having a dry film thickness of 320 μm.

Figure 1:
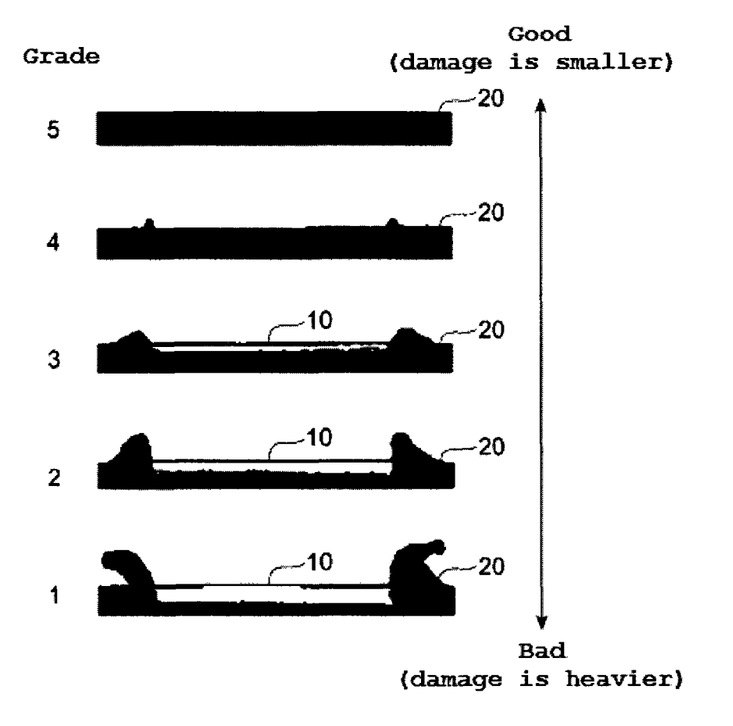
FIG. 1 is a view showing evaluation criteria in a damage resistance test (block pressure test) in the working examples.

Using each antifouling coating composition obtained in the examples and the comparative examples, three of the above test plates were prepared, and they were dried at room temperature (23° C.) for 1, 3 or 7 days. On the coating film (center portion) of each test plate, a wooden chip of 30×30× 10 mm was placed, then a pressure of 40 kgf/cm² (3.9 MPa) was applied to the wooden chip in the perpendicular direction (coating film direction) for 20 minutes, and the state of the coating film surface was observed (degree of deformation of the coating film was measured). The evaluation criteria are shown in FIG. 1. In FIG. 1, numeral 10 designates a wooden chip, and numeral 20 designates a coating film. The evaluation criterion 5 indicates that the coating film 20 is not deformed and is in a best state. The evaluation criterion 4 indicates that deformation of the coating film 20 is slightly observed but the coating film 20 has no mark of the wooden chip 10 and is in a good state. The evaluation criteria 3, 2 and 1 indicate that the coating film is deformed and a mark of the wooden chip 10 is observed, and the degrees of damage (deformation) of the evaluation criteria 3, 2 and 1 are in order of 3<2<1.

(7) Test for Consumption Degree of Antifouling Coating Film

Each antifouling coating composition prepared in the examples and the comparative examples was applied to a rigid vinyl chloride plate of 50×50×1.5 mm by the use of an applicator so that the dry film thickness might become 150 μm, and the composition was dried indoors at room temperature (about 20° C.) for 7 days to prepare a test plate.

This test plate was fixed to the side surface of a rotary drum installed in a constant-temperature bath containing seawater at 25° C., then the rotary drum was rotated at a circumferential velocity of 15 knots, and the consumption degree (decrease in film thickness) of the antifouling coating film was measured every three months.

(8) Test for Static Antifouling Properties of Antifouling Coating Film

A sandblasted steel plate (300 mm (length)×100 mm (width)×3.2 mm (thickness)) was coated with an epoxy anticorrosion coating material ("Bannoh 500" manufactured by Chugoku Marine Paints, Ltd.) so that the dry film thickness might become 150 μm, and then the coating material was dried at room temperature for one day to form a coating film. The surface of this coating film was further coated with an epoxy binder coating material ("Bannoh 500N" manufactured by Chugoku Marine Paints, Ltd.) so that the dry film thickness might become 100 μm, and the coating material was dried at room temperature for one day. Further, the surface of this coating film was coated with each antifouling coating composition obtained in the examples and the comparative examples so that the dry film thickness might become 100 μm, and the composition was dried at room temperature for 7 days to prepare a test plate with an antifouling coating film.

The test plate prepared as above was immersed in Hiroshima Bay, Hiroshima Prefecture for 12 months. Every three months during this period, the area (%) of the coating film surface to which marine organisms except slime had adhered was measured. Then, static antifouling properties of the antifouling coating film were evaluated in accordance with the following [Evaluation criteria for static antifouling properties on the basis of area of adhesion of marine organism].

[Evaluation Criteria for Static Antifouling Properties on the Basis of Area of Adhesion of Marine Organism]

0: No marine organism adheres.

0.5: The area of adhesion of marine organisms is more than 0% but not more than 10%.

1: The area of adhesion of marine organisms is more than 10% but not more than 20%.

2: The area of adhesion of marine organisms is more than 20% but not more than 30%.

3: The area of adhesion of marine organisms is more than 30% but not more than 40%.

4: The area of adhesion of marine organisms is more than 40% but not more than 50%.

5: The area of adhesion of marine organisms is more than 50%.

TABLE 1

|  | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- |
| Hydrolyzable copolymer composition (A-1), heating residue: 55.3% | 35 | 35 | 33 | 35 | 35 | 35 | | |
| Hydrolyzable copolymer composition (A-2), heating residue: 54.8% | | | | | | | 35 | 35 |
| Hydrolyzable copolymer composition (A-3), heating residue: 45.6% | | | | | | | | |
| Hydrolyzable copolymer composition (A-4), heating residue: 53.9% | | | | | | | | |
| Hydrolyzable copolymer composition (A-5), heating residue: 55.0% | | | | | | | | |
| Chlorinated paraffin | 2 | 2 | 2 | 2 | 2 | 2 | 2 | 2 |
| Talc | 17 | 17 | 20 | 17 | 17 | 17 | 17 | 17 |
| Precipitated barium sulfate | 10 | 10 | 12 | 10 | 10 | 10 | 10 | 10 |
| Calcined gypsum | 1 | 1 | 1 | 1 | 1 | 1 | 1 | 1 |
| Potash feldspar | 1 | 1 | 1 | 1 | 1 | 1 | 1 | 1 |
| Zinc oxide | 14 | 14 | 14 | 14 | 14 | 14 | 14 | 14 |
| Red iron oxide | 3 | 3 | 3 | 3 | 3 | 3 | 3 | 3 |
| Copper suboxide | | | | | | | | |
| Copper pyrithione | | 5 | | | | | | 5 |
| Zinc pyrithione | 5 | | | | | | 5 | |
| SEANINE 211N (solids content: 30%) | | | | 2 | | | | |
| Pyridine-triphenylborane | | | | | 5 | | | |
| 4-Bromo-2-(4-chlorophenyl)-5-(trifluoromethyl)-1H-pyrrole-3-carbonitrile | 3 | 3 | 3 | 3 | 3 | 3 | 3 | 3 |
| N,N-dimethyl-N'-tolyl-N'-(fluorodichloromethylthio)sulfamide | | | | | | 5 | | |
| 2-Methylthio-4-tert-butylamino-6-cyclopropyl-s-triazine | | | | | | 5 | | |

TABLE 1-continued

|  | | | | | | | | |
|---|---|---|---|---|---|---|---|---|
| Polyethylene oxide wax (solids content: 20%) | 2 | 2 | 2 | 2 | 2 | 2 | 2 | 2 |
| Fatty acid amide wax (solids content: 20%) | 1.5 | 1.5 | 1.5 | 1.5 | 1.5 | 1.5 | 1.5 | 1.5 |
| N-Butanol | 5.5 | 5.5 | 5.5 | 5.5 | 5.5 | 5.5 | 5.5 | 5.5 |
| Total parts by weight | 100 | 100 | 100 | 100 | 100 | 100 | 100 | 100 |

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| Hydrolyzable copolymer composition (A-1), heating residue: 55.3% | | | | | 35 | 35 | 35 | 35 |
| Hydrolyzable copolymer composition (A-2), heating residue: 54.8% | 33 | 35 | 35 | 35 | | | | |
| Hydrolyzable copolymer composition (A-3), heating residue: 45.6% | | | | | | | | |
| Hydrolyzable copolymer composition (A-4), heating residue: 53.9% | | | | | | | | |
| Hydrolyzable copolymer composition (A-5), heating residue: 55.0% | | | | | | | | |
| Chlorinated paraffin | 2 | 2 | 2 | 2 | 2 | 2 | 2 | 2 |
| Talc | 20 | 17 | 17 | 17 | 17 | 17 | 17 | 17 |
| Precipitated barium sulfate | 12 | 10 | 10 | 10 | 6 | 3 | 3 | 3 |
| Calcined gypsum | 1 | 1 | 1 | 1 | 1 | 1 | 1 | 1 |
| Potash feldspar | 1 | 1 | 1 | 1 | 1 | 1 | 1 | 1 |
| Zinc oxide | 14 | 14 | 14 | 14 | 14 | 14 | 14 | 14 |
| Red iron oxide | 3 | 3 | 3 | 3 | 3 | 3 | 3 | 3 |
| Copper suboxide | | | | | | | | |
| Copper pyrithione | | | | | | | | |
| Zinc pyrithione | | | | | 8 | 8 | 5 | 2 |
| SEANINE 211N (solids content: 30%) | 2 | | | | | | | |
| Pyridine-triphenylborane | | 5 | | | | | | |
| 4-Bromo-2-(4-chlorophenyl)-5-(trifluoromethyl)-1H-pyrrole-3-carbonitrile | 3 | 3 | 3 | 3 | 2 | 5 | 8 | 10 |
| N,N-dimethyl-N'-tolyl-N'-(fluorodichloromethylthio)sulfamide | | | | 5 | | | | |
| 2-Methylthio-4-tert-butylamino-6-cyclopropyl-s-triazine | | | 5 | | | | | |
| Polyethylene oxide wax (solids content: 20%) | 2 | 2 | 2 | 2 | 2 | 2 | 2 | 2 |
| Fatty acid amide wax (solids content: 20%) | 1.5 | 1.5 | 1.5 | 1.5 | 1.5 | 1.5 | 1.5 | 1.5 |
| N-Butanol | 5.5 | 5.5 | 5.5 | 5.5 | 7.5 | 7.5 | 7.5 | 8.5 |
| Total parts by weight | 100 | 100 | 100 | 100 | 100 | 100 | 100 | 100 |

TABLE 2

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
| VOC (g/L) | | 373 | 373 | 387 | 363 | 363 | 368 | 376 | 376 |
| Specific gravity | | 1.56 | 1.56 | 1.58 | 1.52 | 1.52 | 1.54 | 1.56 | 1.56 |
| Heating residue (% by weight) | | 76.1 | 76.1 | 75.5 | 76.1 | 76.1 | 76.1 | 75.9 | 75.9 |
| Coating material viscosity (KU) | | 92 | 95 | 91 | 94 | 90 | 90 | 93 | 95 |
| Airless spraying workability | Atomization properties | A | A | A | A | A | A | A | A |
|  | Appearance | A | A | A | A | A | A | A | A |
| Coating film drying properties/ pressure test | 1 day after drying | 4 | 4 | 3 | 4 | 3 | 3 | 4 | 4 |
|  | 3 days after drying | 5 | 5 | 5 | 5 | 5 | 5 | 5 | 5 |
|  | 7 days after drying | 5 | 5 | 5 | 5 | 5 | 5 | 5 | 5 |
| Coating film consumption properties (25° C./15 knots) | 3 months | 20.1 | 18.3 | 18.4 | 21.3 | 20.4 | 21.4 | 17 | 15.5 |
|  | 6 months | 41.8 | 38.5 | 39 | 41.5 | 40.7 | 42 | 35.2 | 32.3 |
|  | 9 months | 65.8 | 62.2 | 61.9 | 66.1 | 64.2 | 67.1 | 54.5 | 48 |
|  | 12 months | 85.2 | 80.3 | 80.1 | 87.6 | 84.5 | 88.7 | 71.6 | 63.2 |
|  | 15 months | 105.7 | 98.5 | 98.7 | 109 | 105.1 | 110.3 | 88.5 | 78.9 |
| Static antifouling properties | 3 months | 0 | 0 | 0 | 0 | 0 | 0 | 0 | 0 |
|  | 6 months | 0 | 0 | 0 | 0.5 | 0 | 0.5 | 0 | 0.5 |
|  | 9 months | 0 | 1 | 1 | 0.5 | 1 | 1 | 1 | 1 |
|  | 12 months | 1 | 1 | 1 | 1 | 1 | 1 | 1 | 1 |

|  |  | Ex. 9 | Ex. 10 | Ex. 11 | Ex. 12 | Ex. 13 | Ex. 14 | Ex. 15 | Ex. 16 |
|---|---|---|---|---|---|---|---|---|---|
| VOC (g/L) | | 389 | 366 | 366 | 371 | 386 | 381 | 381 | 390 |
| Specific gravity | | 1.58 | 1.52 | 1.52 | 1.54 | 1.49 | 1.47 | 1.47 | 1.45 |
| Heating residue (% by weight) | | 75.4 | 75.9 | 75.9 | 75.9 | 74.1 | 74.1 | 74.1 | 73.1 |
| Coating material viscosity (KU) | | 92 | 95 | 91 | 91 | 94 | 93 | 92 | 90 |
| Airless spraying workability | Atomization properties | A | A | A | A | A | A | A | A |
|  | Appearance | A | A | A | A | A | A | A | A |
| Coating film drying properties/ pressure test | 1 day after drying | 3 | 4 | 3 | 3 | 4 | 4 | 3 | 3 |
|  | 3 days after drying | 5 | 5 | 5 | 5 | 5 | 5 | 5 | 5 |
|  | 7 days after drying | 5 | 5 | 5 | 5 | 5 | 5 | 5 | 5 |

TABLE 2-continued

| | | | | | | | | | |
|---|---|---|---|---|---|---|---|---|---|
| Coating film consumption properties (25° C./15 knots) | 3 months | 16.4 | 17.5 | 17.1 | 18 | 18.1 | 19.5 | 20.7 | 21 |
| | 6 months | 34.7 | 36.2 | 38.9 | 38.2 | 38.5 | 40.2 | 42.6 | 43.8 |
| | 9 months | 52.4 | 55 | 59.6 | 57.1 | 61.4 | 63.1 | 64.8 | 65.3 |
| | 12 months | 68.7 | 72.3 | 76.5 | 75.6 | 79.3 | 82.7 | 85.2 | 86 |
| | 15 months | 85 | 89.9 | 93.2 | 93.1 | 97.4 | 102.2 | 106.5 | 107.3 |
| Static antifouling properties | 3 months | 0 | 0 | 0 | 0 | 0 | 0 | 0 | 0 |
| | 6 months | 0 | 0.5 | 0 | 0.5 | 0 | 0 | 0 | 0 |
| | 9 months | 1 | 1 | 1 | 1 | 1 | 0 | 1 | 1 |
| | 12 months | 1 | 1 | 1 | 1 | 1 | 1 | 1 | 1 |

TABLE 3

| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|
| Hydrolyzable copolymer composition (A-1), heating residue: 55.3% | | | | | | | | | | | |
| Hydrolyzable copolymer composition (A-2), heating residue: 54.8% | | | | | | | | | | | |
| Hydrolyzable copolymer composition (A-3), heating residue: 45.6% | | | | | | | | | | | |
| Hydrolyzable copolymer composition (A-4), heating residue: 53.9% | 35 | 35 | 33 | 35 | 35 | 35 | | | | | |
| Hydrolyzable copolymer composition (A-5), heating residue: 55.0% | | | | | | | 35 | 35 | 33 | 35 | 35 |
| Chlorinated paraffin | 2 | 2 | 2 | 2 | 2 | 2 | 2 | 2 | 2 | 2 | 2 |
| Talc | 17 | 17 | 20 | 17 | 17 | 17 | 17 | 17 | 20 | 17 | 17 |
| Precipitated barium sulfate | 10 | 10 | 12 | 10 | 10 | 10 | 10 | 10 | 12 | 10 | 10 |
| Calcined gypsum | 1 | 1 | 1 | 1 | 1 | 1 | 1 | 1 | 1 | 1 | 1 |
| Potash feldspar | 1 | 1 | 1 | 1 | 1 | 1 | 1 | 1 | 1 | 1 | 1 |
| Zinc oxide | 14 | 14 | 14 | 14 | 14 | 14 | 14 | 14 | 14 | 14 | 14 |
| Red iron oxide | 3 | 3 | 3 | 3 | 3 | 3 | 3 | 3 | 3 | 3 | 3 |
| Copper suboxide | | | | | | | | | | | |
| Copper pyrithione | | 5 | | | | | | 5 | | | |
| Zinc pyrithione | 5 | | | | | | 5 | | | | |
| SEANINE 211N (solids content: 30%) | | | 2 | | | | | | 2 | | |
| Pyridine-triphenylborane | | | | 5 | | | | | | 5 | |
| 4-Bromo-2-(4-chlorophenyl)-5-(trifluoromethyl)-1H-pyrrole-3-carbonitrile | 3 | 3 | 3 | 3 | 3 | 3 | 3 | 3 | 3 | 3 | 3 |
| N,N-dimethyl-N'-tolyl-N'-(fluorodichloromethylthio)sulfamide | | | | | | | 5 | | | | |
| 2-Methylthio-4-tert-butylamino-6-cyclopropyl-s-triazine | | | | | 5 | | | | | | 5 |
| Polyethylene oxide wax (solids content: 20%) | 2 | 2 | 2 | 2 | 2 | 2 | 2 | 2 | 2 | 2 | 2 |
| Fatty acid amide wax (solids content: 20%) | 1.5 | 1.5 | 1.5 | 1.5 | 1.5 | 1.5 | 1.5 | 1.5 | 1.5 | 1.5 | 1.5 |
| N-Butanol | 5.5 | 5.5 | 5.5 | 5.5 | 5.5 | 5.5 | 5.5 | 5.5 | 5.5 | 5.5 | 5.5 |
| Total parts by weight | 100 | 100 | 100 | 100 | 100 | 100 | 100 | 100 | 100 | 100 | 100 |

| | Comp. Ex. 12 | Comp. Ex. 13 | Comp. Ex. 14 | Comp. Ex. 15 | Comp. Ex. 16 | Comp. Ex. 17 | Comp. Ex. 18 | Comp. Ex. 19 | Comp. Ex. 20 | Comp. Ex. 21 | Comp. Ex. 22 |
|---|---|---|---|---|---|---|---|---|---|---|---|
| Hydrolyzable copolymer composition (A-1), heating residue: 55.3% | | | | | | | | | | | |
| Hydrolyzable copolymer composition (A-2), heating residue: 54.8% | | 35 | 35 | 33 | 35 | | | | | | |
| Hydrolyzable copolymer composition (A-3), heating residue: 45.6% | | | | | | 35 | 35 | 33 | 35 | 35 | 35 |
| Hydrolyzable copolymer composition (A-4), heating residue: 53.9% | | | | | | | | | | | |
| Hydrolyzable copolymer composition (A-5), heating residue: 55.0% | 35 | | | | | | | | | | |
| Chlorinated paraffin | 2 | 2 | 2 | 2 | 2 | 2 | 2 | 2 | 2 | 2 | 2 |
| Talc | 17 | 17 | 17 | 20 | 17 | 17 | 17 | 20 | 17 | 17 | 17 |
| Precipitated barium sulfate | 10 | 10 | 10 | 12 | 10 | 10 | 10 | 12 | 10 | 10 | 10 |
| Calcined gypsum | 1 | 1 | 1 | 1 | 1 | 1 | 1 | 1 | 1 | 1 | 1 |
| Potash feldspar | 1 | 1 | 1 | 1 | 1 | 1 | 1 | 1 | 1 | 1 | 1 |
| Zinc oxide | 14 | 14 | 14 | 14 | 14 | 14 | 14 | 14 | 14 | 14 | 14 |
| Red iron oxide | 3 | 3 | 3 | 3 | 3 | 3 | 3 | 3 | 3 | 3 | 3 |
| Copper suboxide | | | | | | | | | | | |
| Copper pyrithione | | | | | | 5 | | 5 | | | |
| Zinc pyrithione | | 5 | 3 | 3 | | 5 | | | | | |
| SEANINE 211N (solids content: 30%) | | | | | 2 | | | | 2 | | |
| Pyridine-triphenylborane | | 3 | 3 | | | | | | | 5 | |

TABLE 3-continued

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|
| 4-Bromo-2-(4-chlorophenyl)-5-(trifluoromethyl)-1H-pyrrole-3-carbonitrile | 3 |  |  |  |  | 3 | 3 | 3 | 3 | 3 | 3 |
| N,N-dimethyl-N'-tolyl-N'-(fluorodichloromethylthio)sulfamide | 5 |  | 2 |  |  |  |  |  |  |  | 5 |
| 2-Methylthio-4-tert-butylamino-6-cyclopropyl-s-triazine |  |  |  |  | 3 |  |  |  | 5 |  |  |
| Polyethylene oxide wax (solids content: 20%) | 2 | 2 | 2 | 2 | 2 | 2 | 2 | 2 | 2 | 2 | 2 |
| Fatty acid amide wax (solids content: 20%) | 1.5 | 1.5 | 1.5 | 1.5 | 1.5 | 1.5 | 1.5 | 1.5 | 1.5 | 1.5 | 1.5 |
| N-Butanol | 5.5 | 5.5 | 5.5 | 5.5 | 5.5 | 5.5 | 5.5 | 5.5 | 5.5 | 5.5 | 5.5 |
| Total parts by weight | 100 | 100 | 100 | 100 | 100 | 100 | 100 | 100 | 100 | 100 | 100 |

TABLE 4

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|---|
| VOC (g/L) |  | 381 | 383 | 396 | 371 | 373 | 378 | 370 | 370 | 382 | 360 | 362 |
| Specific gravity |  | 1.58 | 1.57 | 1.59 | 1.52 | 1.53 | 1.55 | 1.54 | 1.54 | 1.58 | 1.50 | 1.51 |
| Heating residue (% by weight) |  | 75.6 | 75.6 | 75.1 | 75.6 | 75.6 | 75.6 | 76.0 | 76.0 | 75.5 | 76.0 | 76.0 |
| Coating material viscosity (KU) |  | 109 | 108 | 109 | 110 | 107 | 105 | 138 | 140 | 133 | 140 | 134 |
| Airless spraying workability | Atomization properties | B | B | B | B | B | B | C | C | C | C | C |
|  | Appearance | B | B | B | B | B | B | C | C | C | C | C |
| Coating film drying properties/ pressure test | 1 day after drying | 1 | 1 | 1 | 1 | 1 | 1 | 1 | 1 | 1 | 1 | 1 |
|  | 3 days after drying | 1 | 1 | 1 | 1 | 1 | 1 | 1 | 1 | 1 | 1 | 1 |
|  | 7 days after drying | 2 | 2 | 1 | 2 | 1 | 1 | 3 | 3 | 3 | 3 | 2 |
| Coating film consumption properties (25° C./15 knots) | 3 months | 17.9 | 17.2 | 16.9 | 18.5 | 17.5 | 18.2 | 3.4 | 3.2 | 4.5 | 5.4 | 6.3 |
|  | 6 months | 25.3 | 22.9 | 23.7 | 26.3 | 27 | 27.8 | 7.1 | 6.8 | 7.1 | 10.2 | 12.3 |
|  | 9 months | 30.6 | 26.7 | 25 | 31.2 | 30.1 | 32.7 | 8.8 | 8.9 | 10.2 | 12.9 | 16.2 |
|  | 12 months | 34.1 | 29.7 | 26.2 | 34.7 | 32 | 35.9 | 9.5 | 10.6 | 12.3 | 14.7 | 19.4 |
|  | 15 months | 36.8 | 31 | 27.3 | 36.2 | 33.8 | 37.9 | 10.2 | 11.4 | 13.7 | 16 | 20.1 |
| Static antifouling properties | 3 months | 1 | 1 | 1 | 1 | 1 | 1 | 2 | 2 | 2 | 2 | 2 |
|  | 6 months | 3 | 3 | 3 | 2 | 2 | 3 | 4 | 4 | 4 | 4 | 4 |
|  | 9 months | 4 | 4 | 4 | 4 | 4 | 4 | 5 | 5 | 5 | 5 | 5 |
|  | 12 months | 5 | 5 | 5 | 5 | 5 | 5 | 5 | 5 | 5 | 5 | 5 |

|  |  | Comp. Ex. 12 | Comp. Ex. 13 | Comp. Ex. 14 | Comp. Ex. 15 | Comp. Ex. 16 | Comp. Ex. 17 | Comp. Ex. 18 | Comp. Ex. 19 | Comp. Ex. 20 | Comp. Ex. 21 | Comp. Ex. 22 |
|---|---|---|---|---|---|---|---|---|---|---|---|---|
| VOC (g/L) |  | 365 | 371 | 371 | 391 | 374 | 426 | 426 | 438 | 415 | 415 | 420 |
| Specific gravity |  | 1.52 | 1.54 | 1.54 | 1.59 | 1.55 | 1.56 | 1.56 | 1.58 | 1.52 | 1.52 | 1.54 |
| Heating residue (% by weight) |  | 76.0 | 75.9 | 75.9 | 75.4 | 75.9 | 72.7 | 72.7 | 72.3 | 72.7 | 72.7 | 72.7 |
| Coating material viscosity (KU) |  | 131 | 111 | 110 | 114 | 108 | 106 | 110 | 104 | 109 | 102 | 103 |
| Airless spraying workability | Atomization properties | C | B | B | B | B | B | B | B | B | B | B |
|  | Appearance | C | B | B | B | B | B | B | B | B | B | B |
| Coating film drying properties/ pressure test | 1 day after drying | 1 | 4 | 2 | 2 | 3 | 4 | 4 | 3 | 4 | 3 | 3 |
|  | 3 days after drying | 1 | 4 | 2 | 3 | 3 | 5 | 5 | 5 | 5 | 5 | 5 |
|  | 7 days after drying | 2 | 5 | 4 | 4 | 4 | 5 | 5 | 5 | 5 | 5 | 5 |
| Coating film consumption properties (25° C./15 knots) | 3 months | 6.2 | 17.6 | 18.3 | 18.4 | 18.4 | 11.2 | 10.1 | 10.5 | 11.3 | 11.2 | 11.6 |
|  | 6 months | 13.6 | 34.9 | 35.6 | 26.6 | 34.1 | 22.8 | 19.8 | 21.1 | 21.6 | 22.9 | 22.3 |
|  | 9 months | 15.5 | 49.8 | 52.1 | 39.2 | 42.5 | 30.3 | 28.5 | 29.5 | 33.4 | 32.2 | 31.8 |
|  | 12 months | 17 | 52.4 | 56.3 | 42.5 | 46.3 | 39.8 | 34.8 | 37.7 | 39.9 | 40.5 | 42.4 |
|  | 15 months | 18.7 | 56.3 | 58.7 | 45 | 47.9 | 45.4 | 40.5 | 43.1 | 46.9 | 46.8 | 49 |
| Static antifouling properties | 3 months | 2 | 0 | 0 | 1 | 0 | 0 | 0 | 0 | 0 | 0 | 0 |
|  | 6 months | 4 | 0 | 1 | 1 | 2 | 1 | 1 | 1 | 1 | 1 | 1 |
|  | 9 months | 5 | 1 | 2 | 3 | 4 | 1 | 1 | 1 | 1 | 1 | 1 |
|  | 12 months | 5 | 4 | 4 | 5 | 5 | 2 | 2 | 2 | 2 | 2 | 2 |

REFERENCE SIGNS LIST

10: wooden chip
20: antifouling coating film

The invention claimed is:

1. An antifouling coating composition comprising:
a hydrolyzable polymer (A) comprising a structural unit represented by formula (1) and having a weight-average molecular weight of 1000 to 5000; and
an antifouling agent (B) comprising (b1) 4-bromo-2-(4-chlorophenyl)-5-(trifluoromethyl)-1H-pyrrole-3-carbonitrile,
wherein the antifouling coating composition has a volatile organic compound (VOC) content of not more than 400 g/L before the antifouling coating composition is applied to an article, $$\begin{array}{c} | \\ C(R^1)-COO-M-OCO-C(R^1) \\ | \\ CH_2 \end{array} \qquad \begin{array}{c} | \\ \\ | \\ CH_2 \end{array} \qquad (1)$$

wherein M represents zinc or copper, and each $R^1$ independently represents a hydrogen atom or a methyl group.

2. The antifouling coating composition according to claim 1, wherein the antifouling coating composition has a viscosity (KU value) of 85 to 100, as measured by a Stormer viscometer.

3. The antifouling coating composition according to claim 1, wherein a content of the antifouling agent (b1) is 1 to 20 parts by weight based on 100 parts by weight (solids content) of the antifouling coating composition.

4. The antifouling coating composition according to claim 1, wherein the antifouling agent (B) further comprises at least one antifouling agent (b2) selected from the group consisting of zinc pyrithione, copper pyrithione, 4,5-dichloro-2-n-octyl-4-isothiazolin-3-one, triphenylboron.amine complex, 2-methylthio-4-tert-butylamino-6-cyclopropyl-s-triazine, N,N-dimethyl-N'-phenyl-N'-(fluorodichloromethylthio)sulfamide and N,N-dimethyl-N'-tolyl-N'-(fluorodichloromethylthio)sulfamide.

5. The antifouling coating composition according to claim 4, wherein a content of the antifouling agent (b2) is 1 to 20 parts by weight based on 100 parts by weight (solids content) of the antifouling coating composition.

6. The antifouling coating composition according to claim 1, further comprising zinc oxide in an amount of 0.1 to 60 parts by weight based on 100 parts by weight (solids content) of the antifouling coating composition.

7. The antifouling coating composition according to claim 1, wherein the polymer (A) comprises: a constituent unit derived from a monomer (a1) represented by formula (2): $CH_2$=$C(R^1)$—COO-M-O—CO—$C(R^1)$=$CH_2$, wherein in the formula (2), M represents zinc or copper, and each $R^1$ independently represents a hydrogen atom or a methyl group; and a constituent unit derived from an unsaturated monomer (a2) other than the monomer (a1), which is capable of being copolymerized with the monomer (a1).

8. The antifouling coating composition according to claim 7, wherein the monomer (a1) comprises at least one monomer selected from the group consisting of zinc diacrylate, zinc dimethacrylate, copper diacrylate and copper dimethacrylate.

9. The antifouling coating composition according to claim 7, wherein the unsaturated monomer (a2) comprises at least one unsaturated monomer selected from the group consisting of alkyl (meth)acrylate, alkoxyalkyl (meth)acrylate and hydroxyalkyl (meth)acrylate.

10. The antifouling coating composition according to claim 1, wherein a content of zinc and/or copper in the polymer (A) is 0.5 to 25% by weight of the polymer (A).

11. An antifouling coating film formed from the antifouling coating composition according to claim 1.

12. A substrate with an antifouling coating film, the substrate having been coated with the antifouling coating film according to claim 11.

13. A production process for a substrate with an antifouling coating film, the process comprising: forming a coating film made from the antifouling coating composition according to claim 1; and curing the coating film.

* * * * *